US005129930A

United States Patent [19]

Gauthier et al.

[11] Patent Number: 5,129,930

[45] Date of Patent: Jul. 14, 1992

[54] CO-CURRENT CYCLONE MIXER-SEPARATOR AND ITS APPLICATIONS

[75] Inventors: Thierry Gauthier, Saint Genis Laval, France; Maurice Bergougnou; Cédric Briens, both of London, Canada; Pierre Galtier, Vienne Estressin, France

[73] Assignee: Institut Francais du Petrole, Rueil Malmaison, France

[21] Appl. No.: 710,048

[22] Filed: Jun. 4, 1991

[30] Foreign Application Priority Data

Jun. 5, 1990 [FR] France ........ 90 06937

[51] Int. Cl.[5] ........ B01D 45/12

[52] U.S. Cl. ........ 55/394; 55/396; 55/398; 55/457; 55/459.1

[58] Field of Search ........ 55/394, 396, 398, 423, 55/426, 453, 454, 455, 459.1, 459.4, 457

[56] References Cited

U.S. PATENT DOCUMENTS 2,471,178 5/1949 Walsh ........ 55/394 X
3,616,619 11/1971 Klein ........ 55/457 X
3,885,935 5/1975 Nutter ........ 55/457
3,930,816 1/1976 Miczek ........ 55/457 X
4,162,906 7/1979 Sullivan et al. ........ 55/457 X
4,311,494 1/1982 Conner et al. ........ 55/394 X

*Primary Examiner*—Charles Hart
*Attorney, Agent, or Firm*—Millen, White & Zelano

[57] ABSTRACT

A co-current cyclone mixer-separator which makes it possible to separae a light phase L1 contained in a mixture M1 which also contains a dense phase D1 from the dense phase and to mix this phase L1 with a dense phase or with a mixture containing this phase and a light phase. The mixture M1 is introduced at and the phase D1 is recovered at. The dense phase of a mixture is introduced at and enters a second inner enclosure at, at least a part of the phase likewise entering the latter enclosure. A mixture comprising the phases, if it has been introduced, is obtained at. Preferably, the apparatus comprises blades which make it possible to limit the progress of the vortex into the outlet. This apparatus permits of a rapid heat exchange, for exmple the hardening, of a phase by a phase or a mixture. It can also be used for the rapid replacement of a phase contained in a mixture also containing a phase by a phase other than.

7 Claims, 4 Drawing Sheets

CO-CURRENT CYCLONE MIXER-SEPARATOR AND ITS APPLICATIONS

BACKGROUND OF THE INVENTION

The present invention relates to a co-current cyclone mixer-separator. This equipment used in chemical engineering is an apparatus which makes it possible to separate a dense phase D1 contained in a fist mixture M1 containing the said dense phase D1 and a light phase L1, and to mix the said light phase L1 with a dense phase D2 or a second mixture M2 containing a dense phase D2 and a light phase L2.

SUMMARY OF THE INVENTION

The present invention likewise relates to the use of this mixer-separator (hereinafter referred to as the apparatus) for the rapid exchange of heat between a light phase L1 and a dense phase D2 or a mixture M2 containing at least one dense phase D2 and at least one light phase L2 (for example the ultra-rapid hardening of a gas by injection of a cold solid. It likewise relates to the use of this apparatus for the rapid exchange or replacement of a dense phase D1 by another dense phase D2 other than D1 (for example of one solid by another) in a mixture containing a dense phase and a light phase (for example a reactive phase comprising a catalyst which is replaced very rapidly by another catalyst or by the same but less worn catalyst).

The apparatus according to the present invention may thus be used in the process referred to as ultrapyrolysis described for example by Graham et al, World Fluidisation Conference, May 1986, Elsinore Denmark, which is a high temperature cracking process, in the fluidised state and with gas dwell times in the reactor of less than 1 second. In this process, the reaction heat is usually provided by a heat-bearing solid mixed with the batch at the entrance to the reactor, which produces a thermomechanical shock to it. To control the reaction time and attain a good thermal efficiency. it is necessary to separate the heat-bearing solids which are then recycled, from the gaseous products of the reaction and then very rapidly to cool, that is to say to carry out the hardening process, the gaseous products of reaction in a suitable apparatus. For ultra-rapid reactions, the separation and hardening must be as close to each other as possible.

In order to carry out the hardening process simply, cold solids may be injected. For this hardening to be effective, it is necessary to have a system which makes it possible to obtain a mixture which is as effective as possible between the gaseous products of the reaction and the cold solids. A separator system combined in series with a mixer, for example an impact jet mixer, may be envisaged. However, such a system will require two different sets of equipment, and the gas separated from the hot solids will still have to remain for a few moments at a high thermal level, the consequence of which is to allow the reactions to continue for a certain time after separation of the hot solids until such time as these reactions cease by virtue of a sudden drop in the temperature at the moment when the gases come in vcontact withthe cold solids contact with the cold solids.

The apparatus according to the present invention makes it possible to improve the efficiency of the hardening and to simplify the apparatus by grouping within one and the same apparatus the two functions of separating the gaseous products from the hot solids and the ultra-rapid hardening of the gaseous products by the cold solids.

In the application envisaged hereinabove, the apparatus makes it possible to separate the gaseous products of reaction from the hot solids and very effectively to inject cold solids into the gaseous products of reaction, using a modified cyclone. In this apparatus, the vortex induced to separate the hot solids from the gaseous products by centrifugal force and by reason of the differences in volumetric mass of the two phases is likewise used in order effectively to mix the cold solids injected above the gas outlet and in order to achieve a very good transfer of heat. Separation of the hot solids/gas mixture and the cold solids/gas mixture thus takes place in the same equipment and almost simultaneously. The hardening of the gaseous products is therefore virtually instantaneous which makes it possible to stop the reaction at the level of the separator without significantly affecting the thermal efficiency of the hot part of the process since the hot solids do not undergo the hardening.

To be more precise, the present invention relates to a co-current cyclone mixer-separtor of elongated form along at least one axis, and of substantially circular cross-section which comprises in combination:

at least one outer enclosure of substantially circular cross-section of diameter (Dc) and of length (L) comprising at a first end introduction means which make it possible through an inlet referred to as an outer inlet to introduce a first mixture M1 containing at least one dense phase D1 and at least one light phase L1, the said means being adapted to impart at least to the light phase L1 a helical movement in the direction of flow of the said mixture M1 in the said outer enclosure and also comprising means of separating the phases D1 and L1 and at the end opposite th first end recovery means which make it possible to recover at least a part of the said dense phase D1 through an outlet referred to as the outer outlet, at least one first inner enclosure of substantially circular cross-section and of length (Li) which is less than (L) disposed coaxially in relation to the said outer enclosure, comprising at a first end, situated close to the said first end of the outer enclosure, introduction means which make it possible through an inlet referred to as the first inner inlet, to introduce at least one dense phase D2 or at least one mixture M2 containing at least one dense phase D2 and at least one light phase L2, the said means making it possible to introduce the said dense phase D2 or the said mixture M2 so that they flow in the same direction as the flow of the mixture M1 in the same direction as the flow of the mixture M1 as far as the second end, opposite the said first end, through which the said dense phase D2 or the said mixture M2 emerges from the said first inner enclosure through a first outlet referred to as the first inner outlet, of diameter (Di) which is less than (Dc), at least one second inner enclosure of substantially circular cross-section disposed coaxially in relation to the said first inner enclosure, comprising a first end situated at a distance (Le) from the said second end of the first inner enclosure, the said distance (Le) being approx. 0.1x (Dc) to approx. 10x (Dc), into which through an inlet referred to as the second inner inlet of diameter (De) greater than or equal to (Di) and less than (Dc) at least a part of the light phase L1 and at least a part of the dense phase D2 or of a mixture M2 enter, the said second enclosure comprising at the end opposite its first end recovery means which make it possible through an outlet referred to as the second inner outlet, to recover the mixture formed in the said second enclosure comprising at least a part of the light phase L1 and at least a part of the dense phase D2 or the mixture M2, the mixer-separator comprising at least one means which makes it possible to draw off through the outer outlet at least a part of the light phase L1 in mixture with the dense phase D1, the said mixer-separator comprising on the downstream side in the direction of flow of the various phases of the second inner inlet means limiting the progression of the light phase L1 in the space situated between the outer wall of the second inner enclosure and the inner wall of the outer enclosure, the said means of limiting the progression of the light phase L1 being substantially flat blades the plane of which comprises the axis of the mixer separator.

BRIEF DESCRIPTION OF THE DRAWINGS

The invention will be more clearly understood from the description of forms of embodiment given purely by way of illustration and implying no limitation, and which reference is made to the appended drawings in which similar parts are designated by the same reference numerals and letters.

FIG. 1B is a perspective view of an apparatus according to the invention which differs from that shown in FIG. 1A only in the means (7) of discharging the dense phase D1 introduced through the pipe (1), the said means (7) which in the embodiment shown diagrammatically in FIG. 1A permitting lateral outlet (10) of the dense phase (1) and an axial outlet (10) of this phase in the embodiment shown diagrammatically in FIG. 1B.

FIG. 2 is a cross-sectional view of an apparatus according to the invention which is virtually identical to that shown in FIG. 1A but it comprises means (6) the dimensions of which in the direction at right-angles to the axis of the apparatus is smaller than the dimension of the outer outlet (5).

Figure 1A:
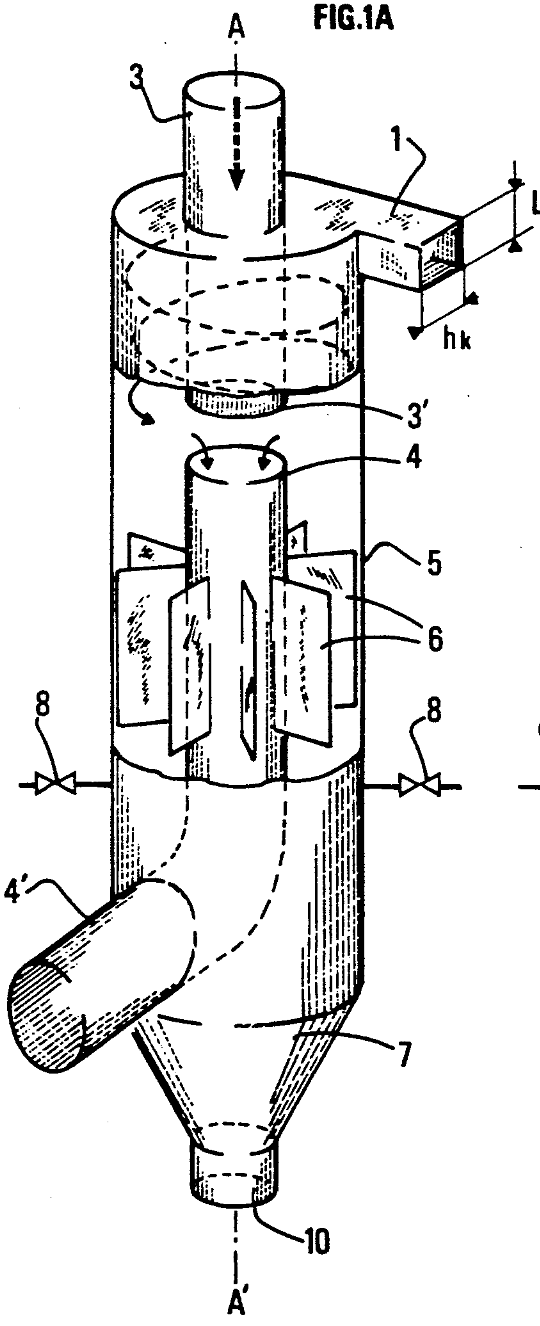
FIG. 1A is a perspective view of a first embodiment of an apparatus according to the invention.
Figure 2:
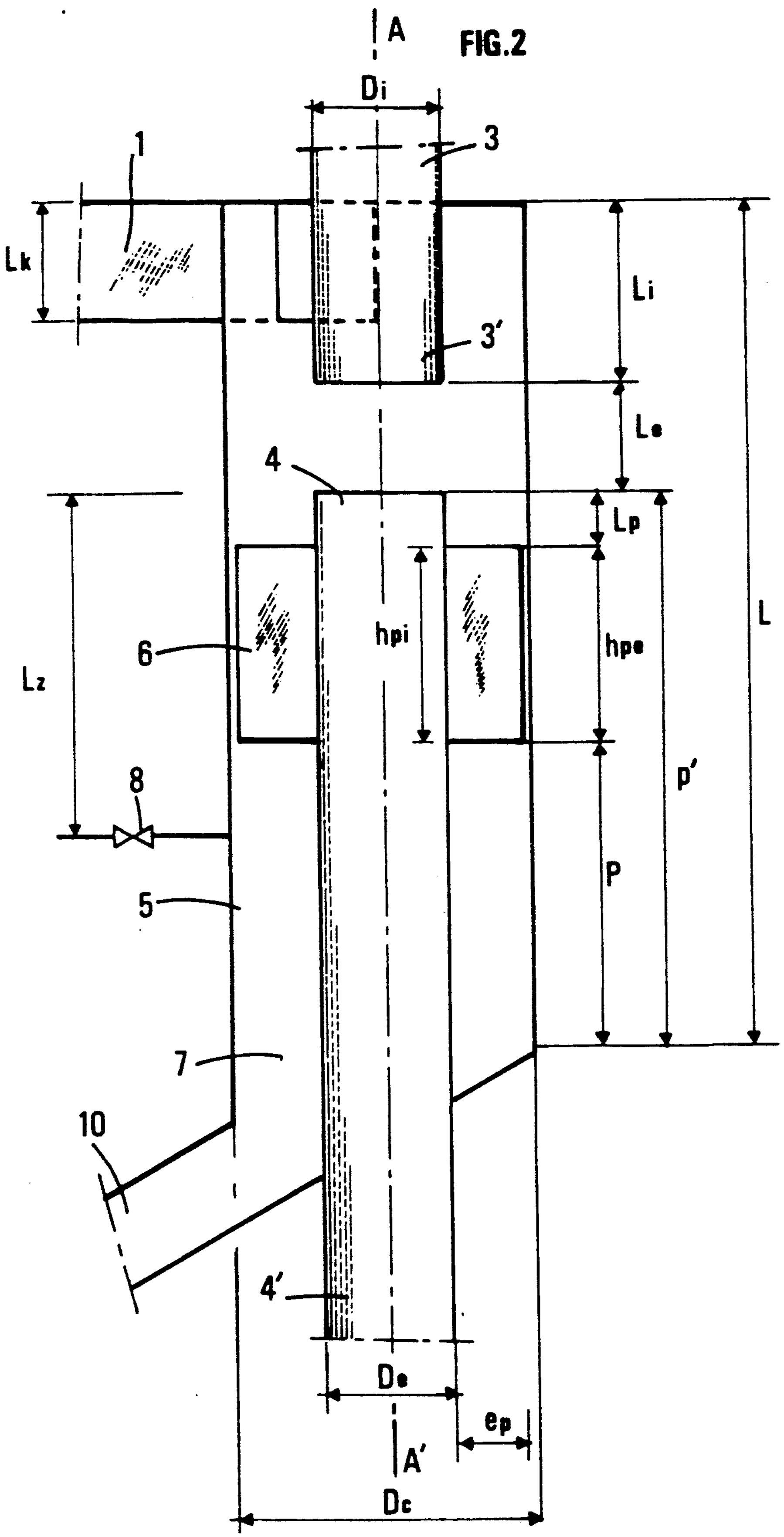
FIG. 2 is a side view with portions of the outer enclosure deleted for clarity of the second embodiment of the invention.

The apparatuses according to the invention shown diagrammatically in FIGS. 1A and 2 are of substantially regular elongate form and extend along an axis AA' which is an axis of symmetry and they comprise an outer enclosure of diameter (Dc) and length (L) having a tangential inlet (1) referred to as the outer inlet into which in a direction substantially at right-angles to the axis of the apparatus the mixture M1 containing at least one dense phase D1 and at least one light phase L1 is introduced. This tangential inlet preferably has a rectangular or square cross-section of which the side parallel with the axis of the apparatus has a dimension (Lk) which is usually approx. 0.25 to approx. 1 times the diameter (Dc) while the side at right-angles to the axis of the apparatus has a dimension (hk) usually approx. 0.05 to approx. 0.5 times the diameter (Dc).

The mixture M1 which is thus introduced is rolled around a first inner enclosure disposed coaxially in relation to the outer enclosure, having an axial inlet (3) referred to as the first inner inlet, for the introduction of at least one dense phase D2 or preferably at least one mixture M2 containing a dense phase D2 and a light phase L2. This dense phase D2 or this mixture M2 circulates parallel with the axis (AA') of the apparatus as far as the first inner outlet (3') of diameter (Di) less than the diameter (Dc) of the outer enclosure of the apparatus and usually approx. 0.05 to approx. 0.9 times this diameter (Dc) and preferably approx. 0.4 to approx. 0.8 times this diameter (Dc).

The length (Li) between the extreme level of the tangential inlet (1) and the first inner outlet is less than (L) and is usually approx. 0.2 to approx. 9.5 times the diameter (Dc) and preferably approx. 1 to approx. 3 times this diameter (Dc).

Figure 1B:
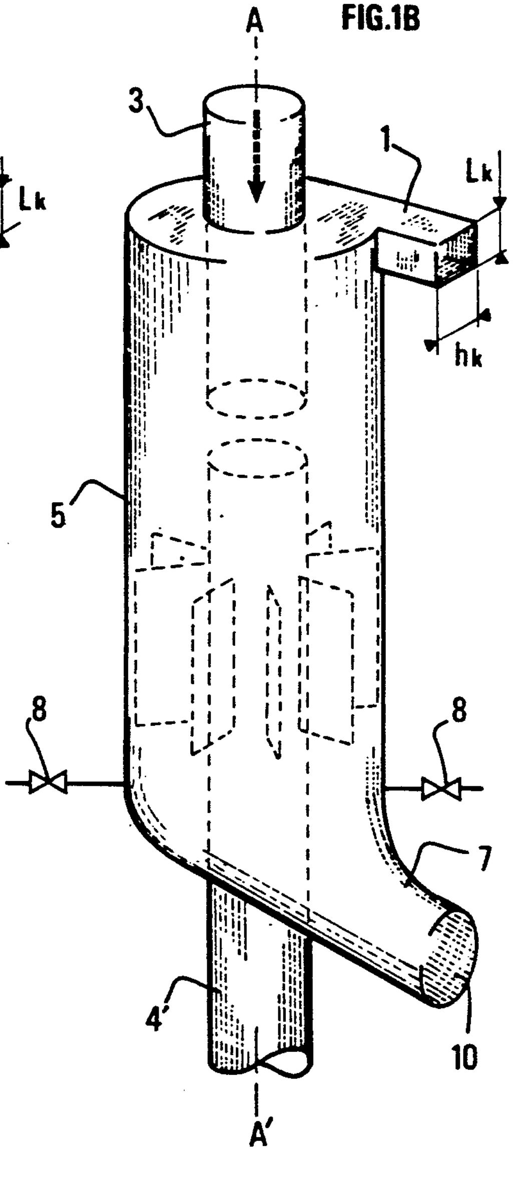
FIG. 1B is a perspective view of a second embodiment of the invention.

Although it is not shown in FIGS. 1A, 1B and 2 it is possible and usually desirable in the case of considerable rates of flow of the various phases at the level of the inlets to the apparatus to use means which make it possible to encourage formation of the vortex such as for example a helical roof descending from the extreme level of the tangential inlet (1) or a for instance* outer spiral and to limit turbulence at the level of the tangential input (1). Usually the pitch of the spiral is approx. 0.01 to approx. 3 times the value of (Lk) and more often than not it is approx. 0.5 to approx. 1.5 times this value.

The dense phase D2 or the mixture M2 then at least partly enters the second inner enclosure disposed coaxially of the first inner enclosure, throught the second inner inlet (4) situated at a distance (Le) from the first inner outlet (3'), this distance preferably being approx. 0.2 to approx. twice the diameter (Dc). At least a part of the light phase L1 likewise enters this second enclosure. This second inner inlet (4) has an inside diameter (De) which is greater than or equal to (Di) and less than (Dc) and is usually approx. 0.2 to approx. 0.9 times the diameter (Dc). This diameter (Di) is preferably approx. 0.4 to approx. 0.8 times the diameter (Dc). Recovered through the second inner outlet (4') of the apparatus is a mixture comprising at least a part of the light phase L1 and at least a part of the dense phase D2 or of the mixture M2 comprising a dense phase D2 and a light phase L2.

According to the embodiment shown diagrammatically in FIGS. 1A and 2 the apparatus comprises, in a direction of flow of the various phases, downstream of the second inner inlet, means (6) to limit the progression of the light phase L1 into the space situated between the inner wall of the outer enclosure and the outer wall of the second inner enclosure or outer outlet (5). The said means (6) are preferably substantially flat blades the plane of which comprises the axis of the apparatus. The said means (6) are usually fixed on at least one wall of one of the enclosures, the inner or outer enclosure. Said means (6) are preferably fixed to the outer wall of the second inner enclosure so that the distance (Lp) between the second inner inlet and the tip of the said blades which is closest to this second inner inlet is approx. 0 to approx. 5 times the diameter (Dc) and preferably approx. 0.1 to approx. 1 times this diameter (Dc).

The number of blades varies according to the distribution of the dwell time which is acceptable for phase L1 and likewise as a function of the diameter (Dc) of the outer enclosure. If the dwell time of the phase L1 can have a wide distribution, it will then not be indispensable to have blades. The number of blades is generally between 0 and approx. 50 and most frequently, when blades are provided, between at least 2 and for example between 2 and approx. 50 and preferably 3 to approx. 50. Thus, in the case of the use of an apparatus according to the invention in the performance of ultra-rapid reactions, for example in the case of ultrapyrolysis, in which it is often necessary to limit the distribution of dwell times of the light phase in the apparatus, particularly permitting separation and hardening of a light phase, the blades will, by limiting the continuation of the vortex over the entire cross-section of the cyclone around the inner outlet (4) for the light phase, allow a reduction in and control of the distribution of the dwell times and consequently a limiting of the deterioration of the products contained in the light phase circulating around the inner outlet.

Each of these blades normally has a size or width (ep) measured in the direction at right-angles to the axis of the apparatus and defined in relation to the inside diameter (Dc) of the outer enclosure and the outside diameter (De) of the second inside enclosure of approx. 0.01 to 1 times the value [((Dc)−(D'e))/2] of the half-difference of these diameters (Dc) and (D'e), preferably approx. 0.5 to 1 times this value and most frequently of approx. 0.9 to once this value.

These blades each have on their edge closest to the axis of the inner enclosures in the direction parallel with this axis an inner dimension or height (hpi) and an outer dimension or height (hpe) measured in the direction of the axis of the apparatus on the edge of the said blade closest to the inside wall of the outer enclosure. These dimensions (hpi) and (hpe) are normally greater than 0.1 times the diameter (Dc) and for example approx. 0.1 to about 10 times the diameter (Dc) and mostly approx. 1 to approx. 4 times this diameter (Dc). Preferably, each of these blades has a dimension (hpi) greater than or equal to their dimension (hpe).

According to the embodiment shown diagrammatically in FIGS. 1A and 2 the apparatus comprises, in the direction of flow of the various phases, downstream of the second inner inlet, means (8) for possible introduction of a light phase L3 at least at a point situated between the second inner inlet (4) of the second inner enclosure and the outer outlet (10) for the dense phase D1; this point or these points is/are preferably at a distance (Lz) from the inlet (4) of the second inner enclosure. The said distance (Lz) is preferably at least equal to the sum of (Lp) and (hpi) and at most equal to the distance between the inlet (4) of the second inner enclosure and the means (7) through which the dense phase D1 emerges. This light phase L3 may be introduced for example in the case of its being desirable to strip the dense phase D1. The light phase L3 is preferably introduced at a plurality of points which are usually symmetrically distributed around the outer enclosure in a plane at the level of which insertion is carried out.

The introduction point or points for this light phase L3 are usually situated at a distance at least equal to 0.1 times the diameter (Dc) of the inlet (4) of the second inner enclosure when the apparatus does not comprise means (6) or from the point of the said means (6) which is closest to the means (7) through which the dense phase D1 passes before emerging through outlet 9 when the apparatus comprises means (6). The point or points for introduction of this light phase L3 is/are preferably situated close to the outer outlet (10) and more often than not close to the means (7) through which the dense phase D1 emerges.

The dimension (p') between the level of the second inner inlet (4) and the means (7) for the discharge of the dense phase D1 is determined on a basis of the other dimensions of the various means forming the apparatus and the length (L) of the outer enclosure measured between the extreme level of the tangential inlet (1) and the means (7) for discharge of the dense phase D1. This dimension (L) is normally approx. 1 to approx. 35 times the diameter (Dc) of the outer enclosure and most frequently approx. 1 to 25 times this diameter (Dc). It is likewise possible to calculate the dimension (P) between the point of the means (6) which is closest to the means (7) for emergence of the dense phsae D1 and the said means (7) on a basis of the other dimensions of the various means forming the apparatus and the length (L).

It would not go beyond the scope of the present invention if the axis (AA') of the apparatus were to form an angle to the vertical. In this case, it is however preferably if the means (6) limiting the circulation of the light phase L1 in its outer outlet (5) and therefore reducing the distribution of the dwell times of this phase L1 in the apparatus are used, to place them vertically and therefore produce an apparatus which in the case of an axial inner outlet (4') comprises a bend beyond which the said means (6) will be positioned in the vertical outer outlet. Similarly, in the case of an apparatus such as that shown diagrammatically in FIG. 1B having a lateral outlet (4') it is possible to position the means (6) (limiting the circulation of the light phase L1 in the outer outlet (5) and therefore reducing the distribution of the dwell times of this phase L1 in the apparatus) after the level of the inner outlet (4') and upstream of the means (7).

The means (6) limit progress of the vortex of the light phase L1 into the outer outlet (5). The position of these means (6) and their number therefore affect the performance attainable in the separation of the phase D1 and L1 contained in the mixture M1 (loss of head and efficiency in collection of the dense phase D1) and also affect penetration of the vortex of the light phase L1 into the outlet (5). These parameters are therefore chosen carefully by a man skilled in the art, particularly as a function of the desired results and the tolerated loss of head. Particularly when D1 is a solid, the number of blades, their shape and position will be chosen carefully taking into account their influence on the flow of the solid in conjunction with the desired limitation of the progression of the vortex into the outer outlet (5).

Figure 3:
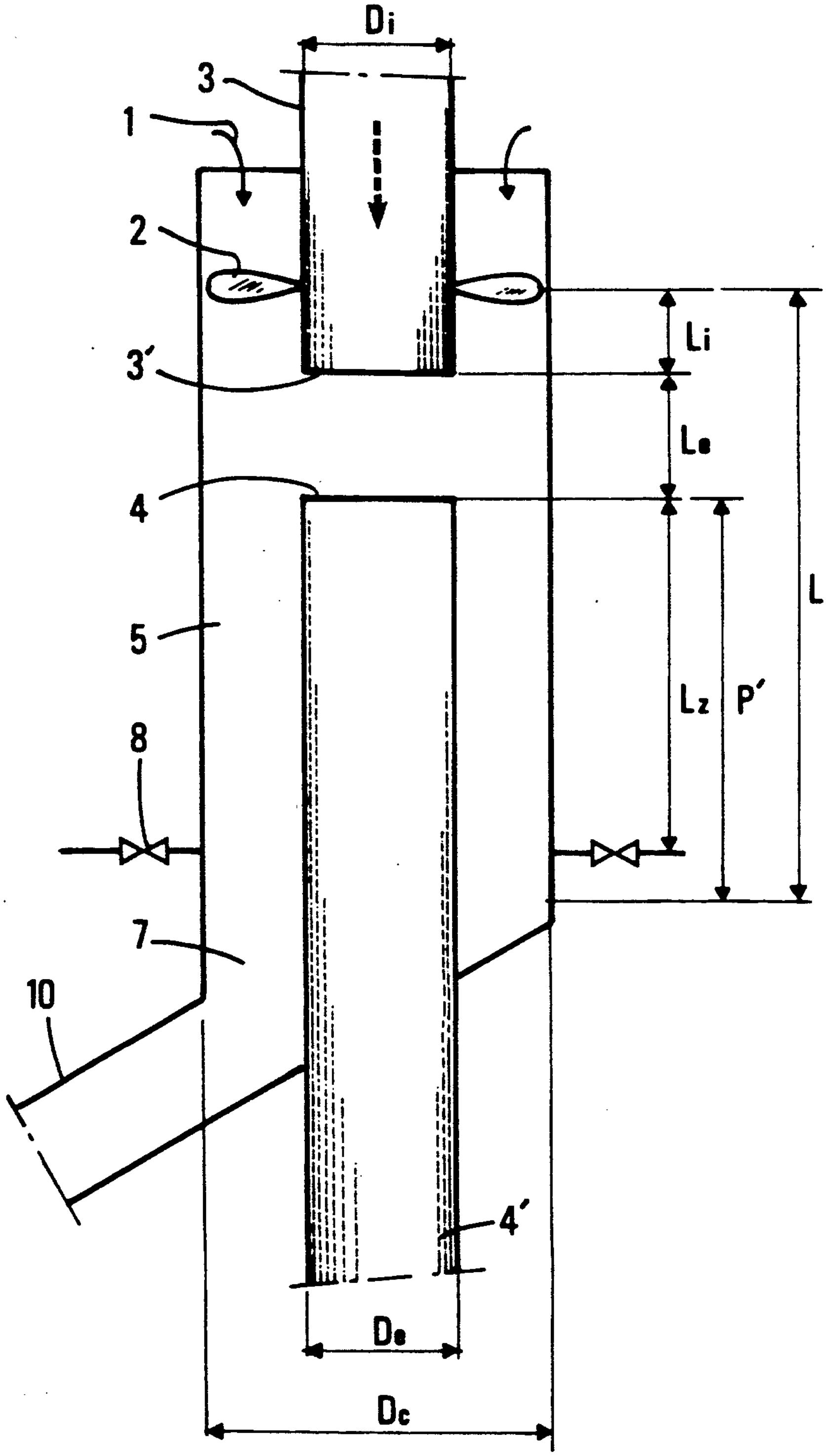
FIG. 3 is a side view of a third embodiment of the invention with portions of the outer enclosure deleted for clarity.
Figure 4:
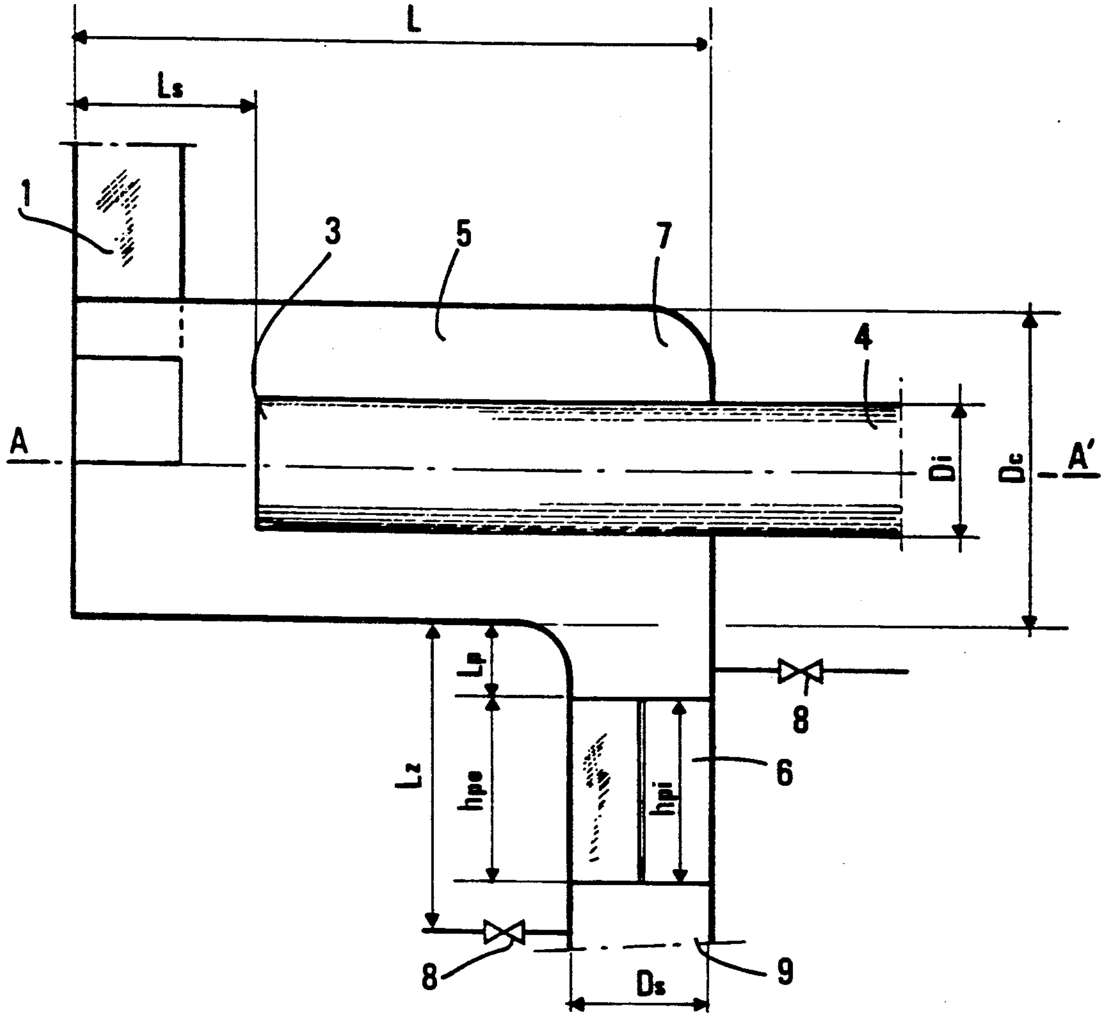
Figure 5:
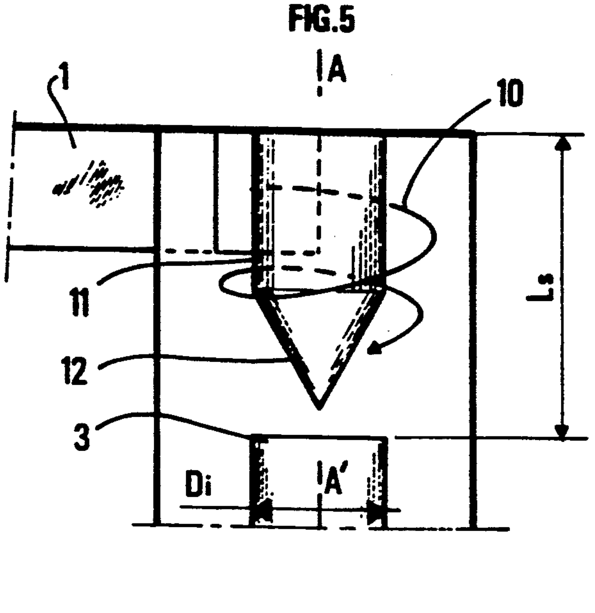

FIG. 3 is a perspective view of an apparatus according to the invention comprising an outer enclosure of diameter (Dc) having an inlet (1) referred to as the axial outer inlet, into which in a direction substantially parallel with the axis (AA') of the apparatus the mixture M1 is introduced and contains a dense phase D1 and a light phase L1. This apparatus furthermore comprises means (2) placed inside the inlet (1) in the space situated between the inner wall of the outer enclosure and the outer wall of the first inner enclosure so that on the downstream side, in the direction of travel of the said mixture M1, a helical or turbulent movement can be imparted at least to the phase L1 of the said mixture M1. These means are normally inclined blades. The length (L) of the apparatus is counted between these means, making it possible to create a vortex at least on the phase L1 and the means (7) through which the dense phase D1 emerges. This apparatus comprises no means (6) for limiting penetration of the vortex into the outer outlet (5). All the other characteristic features are identical to those described in connection with the apparatuses shown in FIGS. 1A and 2, in particular the various dimensions of those mentioned in the description of these apparatuses. The alternatives described in connection with the apparatuses shown in FIGS. 1A and 2 are likewise possible in the case of the apparatus according to the present invention which is shown diagrammatically in FIG. 3. In particular, it is possible to envisage a lateral inner outlet (4') and an axial outer outlet (10) as in the case of the embodiment shown diagrammatically in FIG. 1B and likewise the use of means (6) in the outer outlet (5).

The means (7) through which the dense phase D1 emerges normally make it possible to collect and channel this dense phase D1 as far as the outer outlet (10). These means are most frequently an inclined bottom or a cone which may or may not be on the same axis as the inner outlet (4').

The apparatuses according to the present invention thus permit the transfer of heat and/or material between the various phases present. With regard to the light phases L1, L2 and L3, these phases are liquid or gaseous phases or phases containing both liquid and gas and with regard to the dense phases D1 and D2 these are solid phases (in the form of particles), liquids or phases containing both solid and liquid. Two cases are frequently encountered: the first in which the dense phases are solids and the light phases are gases and the second in which there is a liquid phase which may be the dense phase or the light phase.

The apparatuses according to the present invention shown diagrammatically in the attached drawings comprise a single axis (AA') but it will not go beyond the scope of the present invention if an apparatus were to be produced which comprises a plurality were to be produced which comprises a plurality of axes which for example form an angle inter se. In this case the axis (AA') mentioned above would be the axis of the part of the apparatus situated between the first inner inlet (3) and the first inner outlet (3') and the diameter (Dc) would be that measured at the level of this inner outlet (3'), this axis (AA') in this case also being the axis of the second inner enclosure, the two inner enclosures being disposed coaxially (such a case is for example the case of an apparatus comprising an angled out enclosure).

The diameter (Dc) of the apparatus measured at the level of the firsst inner outlet (3') is usually approx. 0.01 to approx. 10 m (meters) and is most frequently approx. 0.05 to approx. 2 m. It is usually preferable to retain a constant diameter over the entire length (L) of the apparatus or even from the level of injection of the mixture M1 as far as the level of the means (7) through which the dense phase D1 emerges; however, it would not go beyond the scope of the invention if an apparatus were to comprise widened or narrowed cross-sections between the said levels.

To obtain a good separation of a phase L1 contained in a mixture M1 also comprising at least one phase D1 and an effective mixing of this phase L1 with at least one phase D2 it is peferable to have a high superficial rate of intake of this phase L1 for example approx. 5 to approx. 150 $m \times s^{-1}$ (metres per second) and preferably about 10 to about 75 $m \times s^{-1}$. The ratio by weight of the rate of flow of the phase D1 to the rate of flow of the phase L1 is usually approx. 0.0001:1 to approx. 50:1 and most frequently approx. 0.1:1 to approx. 15:1. The rate of flow of the phase D2 normally represents by weight approx. 0.1 to approx. 1000% of the rate of flow of the phase D1 and most frequently appox. 10 to approx. 300% of the rate of flow of th epahse D1. The superficial speed V2 of the phase L2 when it is present is usually approx. 1 to approx. 500% of the mean axial speed V1 over the entire cross-section of diameter (Dc) situated between the first inner outlet (3') and the second inner inlet (4) defined by the equation:

$$V1 = L1/(\pi \times Dc^2)/4$$

in which L1 is expressed in $m^3 \times s^{-1}$ (cubic metres per second) and Dc in metres. The surface speed V2 will preferably be approx. 5 to approx. 150% of the speed V1.

For instance by increasing the pressure on the downstream side in the direction of travel of the dense phase D2 from the second inner inlet (4) or by reducing the pressure on the downstream side, in the direction of travel of the dense phase D1, of the means (7) through which this phase emerges, it is possible to draw off a more or less substantial part of the phase L1 together with the phase D1 and simultaneously to obtain at the level of the second outlet (4') a mixture which is virtually completely free from phase D1. It is thus possible to draw off up to 90% of the phase L1 with D1 but mostly approx. 1 to approx. 10% of this phase L1 will be drawn off with the phase D1. The fluctuations in pressure which make it possible to act on the quantity of phase L1 drawn off with the phase D1 are made possible by means well known to a man skilled in the art and for example they involve acting on the temperature of hardening by altering the rates of flow of phases L2 and/of D2 or modifying the rate of flow of the phase L3 or modifying the working conditions downstream of the outlet (10).

In the various apparatuses according to the invention and in the various methods of injection of the mixture M1, such drawing off may make it possible to improved the efficiency of recoery of the dense phase D1. Thus in an advantageous form of embodiment of the invention the apparatus will comprise at least one means permitting of at least a part of the light phase L1 in mixture with the dense phase D1 to be drawn off through the outer outlet.

The choice between an apparatus comprising a tangential inlet for the mixture M1 and an apparatus comprising an axial inlet for this mixture M1 is normally governed by the ratio be weight of the rates of flow of th phases L1 and D1. If this ratio is less thatn 2:1 it may be advantageous to choose an apparatus with an axial inlet.

The following example is given by way of illustration and shows the efficiency of separation of a dense (solid) phase D1 contained in a mixture M1 which also contains a light (gaseous) phase L1 and likewise the efficiency of hardening of this gaseous phase L1 by a mixture M2 containing a solid phase D2 and a gaseous phase L2.

It will be noted that in the closest prior art, U.S. Pat. No. 2,650,675, the technique described concerns a simple separation of a light phase and a dense phase in a mixture and not a separation of two mixtures each comprising a light phase and a heavy phase.

EXAMPLE

Two apparatuses are produced having vertical axes in accordance with those shown diagrammatically in FIGS. 1A and 2, comprising a tangential inlet and having a roof descending over ¾ of a turn steadily over a height equal to the value of Lk. These apparatuses have the geometrical characteristics mentioned in the following Table I.

TABLE I

| | Apparatus A | Apparatus B |
|---|---|---|
| Dimensions in cm | with blades | without blades |
| Dc | 5.1 | 5.1 |
| Di | 2.5 | 2.5 |
| De | 2.5 | 2.5 |
| Li | 5.1 | 5.1 |
| Le | 1.2 | 1.2 |
| Lk | 2.5 | 2.5 |
| Lp | 2.5 | — |
| hpe | 5.1 | — |
| hpi | 5.1 | — |
| hk | 1.3 | 1.3 |
| ep | 1.2 | — |
| Np* (number) | 8 | 0 |
| p' | 25 | 25 |

*Np represents the number of blades. The other symbols are defined in the description.

The flow of hases introduced are characterised by the following notations:

Inlet temperature: T
Calorific capacity: Cp
Heat conductivity: k
Mass rate of flow: F
Volumetric rate of flow: Q
Volumetric mass: R
Surface speed: V
Particle diameter: ds The phase L1 is air and has the following characteristics:

TL1=700° C., CpL1=1000 J/Kg°C., kL1-0.034 W/m°C.,
FL1=3.75×$10^{-3}$ Kg/s, QL1=10.7×$10^{-3}$ $m^3$/s,
VL1-V1=33 m/s.

The phase L2 is air with the following characteristics:

TL2=150° C., CpL2=1000 J/Kg°C., kL2=0.063 W/m°C.,
FL2=1.67×$10^{-3}$ Kg/s, QL2=2×$10^{-3}$ $m^3$/s,
VL2=V2=4.1 m/s.

There is no injection of phase L3.

The phase D1 is sand having the following characteristics:

TD1=700° C., CpD1=800 J/Kg°C., kD1=0.5 W/m°C.,
FD1=18.75×$10^{-3}$ Kg/s, RD1=2500 Kg/$m^3$,
DsD1=29×$10^{-6}$ m.

The phase D2 is sand having the following characteristics:

TD2=150° C., CpD2=800 J/Kg°C., dD2=0.5 W/m°C.,
TD2=17.05×$10^{-3}$ Kg/s, RD2=2500 Kg/$m^3$,
dsD2=65×$10^{-6}$ m.

The performance levels of the apparatuses mentioned in Table II are expressed as follows: ED1= efficiency of separation of D1 in the apparatus (ratio of the mass rate of flow of D1 measured in the outer outlet (10) to the mass rate of flow introduced into the tangential inlet (1)) with draw off of the phase L1 into the outer outlet (10) of 2% by weight in relation to the weight of L1 introduced into the tangential inlet (1).

Pvortex= distance between the end of the vortex of L1 in the outer outlet (5) and the top of the second inner inlet (4). Thradening= temperature of the gaseous mixture formed by L1 and L2 measured at a distance of 1 m from the top of the second inner inlet (4).

TABLE II

| Performance | Apparatus A | Apparatus B |
|---|---|---|
| ED1 | 98.4% | 98.1% |
| Pvortex | 4 cm | 23 cm |
| Thardening | 295° C. | 310° C. |

We claim:

1. A co-current cyclone mixer-separator of elongated form, having first and second ends and extending along at least one axis of substantially circular cross-section comprising in combination:

at least one outer enclosure of substantially circular cross-section of diameter (Dc) and of length (L) comprising at the first end an introduction (1) through which a first mixture M1 containing at least one dense phase D1 and at least one light phase L1 are introduced, the mixture M1 being introduced, said introduction means including means for imparting at least to the light phase L1 a helical movement in the direction of flow of said mixture M1 in said outer enclosure and also including means for separating the phases D1 and L1 and, at the second end oppsoite the first end, providing recovery means for recovering at least a part of said dense phase D1 through an outer outlet, an inner enclosure of substantially circular cross-section and of length (Li) which is less than the length (L) and is disposed coaxially in relation to said outer enclosure, the inner enclosure comprising at a first end, situated proximate said first end of the outer enclosure, introduction means for providing a first inner inlet for the introduction of at least one dense phase D2 or at least one mixture M2 containing at least one dense phase D2 and at least one light phase L2, said introduction means introducing the dense phase D2 or said mixture M2 to flow in the same direction as that of the mixture M1 as far as the second end of the outer enclosure through which second end said dense phase D2 or said mixture M2 emerges from said first inner enclosure through a first inner outlet of a diameter (Di) which is less than the diameter (Dc), a second inner enclosure of substantially circular cross-section disposed coaxially in relation to said first inner enclosure, the second inner enclosure comprising a first end situated at a distance (Le) from said second end of the first inner enclosure, said distance (Le) being approximately 0.1x(Dc) to approximately 10x(Dc), into which through an inlet, referred to as the second inner inlet of diameter (De) greater than or equal to (Di) and less than (Dc), at least a part of the light phase L1 and at least a part of the dense phase D2 or of a mixture M2 enter, said second enclosure comprising at the end opposite its first end recovery means which includes an outlet referred to as the second inner outlet, the second inner outlet allowing the recovery of the mixture formed in said second enclosure, that mixture comprising at least a part of the light phase L1 and at least a part of the dense phase D2 of the mixture M2, the mixer-separator comprising at least one means which allows drawing off through the outer outlet at least a part of the light phase L1 in mixture with the dense phase D1, said mixer-separator comprising on the downstream side in the direction of flow of the various phases of the second inner inlet means limiting the progression of the light phase L1 in the space situated between the outer wall of the second inner enclosure and the inner wall of the outer enclosure, said means for limiting the progression of the light phase L1 being a plurality of substantially flat blades, having planes of extenstion which include which a plurality of the axis of the mixer-separator.

2. A mixer-separator according to claim 1 comprising from 2 to approx. 50 blades fixed to the outer wall of the second inner enclosure so that the distance between the second inner inlet and the point of the said blades which is closest to this second inner inlet is approx. 0 to approx. 5x(Dc).

3. A mixer-separator according to claim 1, in which the blades each having a dimension (ep) measured in the direction at right-angles to the axis of the mixer-separator of approximately once the value corresponding to the distance between the outer wall of the second inner enclosure of outside diameter (D'e) and in the inner wall of the outer enclosure of outside diameter (D'e) and in the inner wall of the outer enclosure of inside diameter (Dc) is calculated, a dimension (hpi) is measured on the edge of the blade closest to the axis of the inner enclosures in a direction parallel with this axis and a dimension (hpe) is measured in the direction parallel with the axis of the mixer-separator on the edge of the blade closest to the inner wall of the outer enclosure, said dimensions (hpi) and (hpe) being approximately 0.1x(Dc) to 10x(Dc).

4. A mixer-separator according to claim 3 in which the blades each have a dimension (hpi) greater than or equal to (hpe).

5. A mixer-separator according to claim 1, comprising means for introducing a light phase L3 between the second inner inlet and the outer outlet, the said means preferably being situated close to the said outer outlet.

6. Use of the mixer-separator according to claim 1, useful for the rapid exchange of heat between a light phase L1 and a dense phase D2 or between a mixture M2 containing at least one dense phase D2 and at least one light phase L2.

7. Use of the mixer-separator according to claims 1, useful for the rapid replacement of a dense phase D1 contained in a mixture M1 comprising in addition a light phase L1, by a dense phase D2 which is different from D1.

* * * * *